United States Patent Office 3,387,072
Patented June 4, 1968

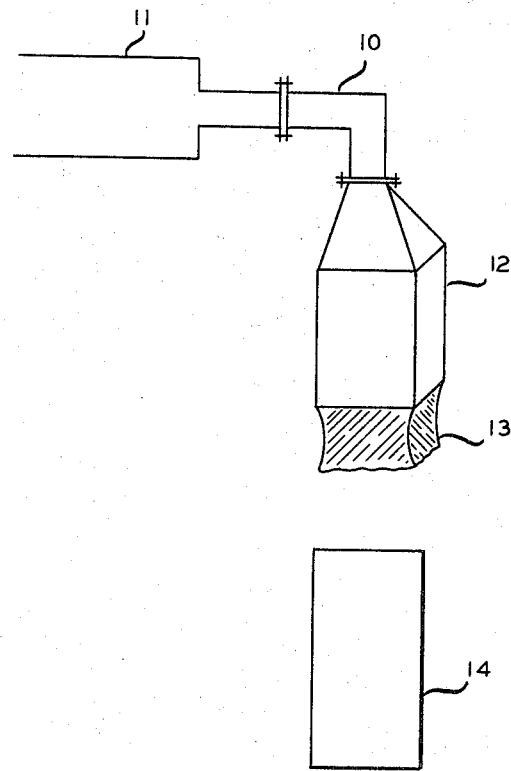

3,387,072
PROCESS FOR THE PRODUCTION OF VOID-FREE BLOCKS FROM THERMOPLASTIC MATERIAL
Archibald Carmichael Leitch, Penarth, Glamorgan, Wales, assignor to The Distillers Company Limited, Edinburgh, Scotland, a British company
Filed Jan. 24, 1964, Ser. No. 339,984
4 Claims. (Cl. 264—210)

ABSTRACT OF THE DISCLOSURE

Solid, void-free blocks of polymeric, thermoplastic material are prepared by extruding said material, stretching the resulting hot extrudate and thereafter forming same to a desired shape in a mold.

The present invention relates to a process for the production of void-free solid blocks from thermoplastic material having a high coefficient of expansion, especially in the region of its softening point. In one aspect, it relates to the production of such blocks from high density polymers and copolymers of ethylene.

When the temperature of a mass of high density polyethylene is reduced from about 150° C. to room temperature, there is a volume shrinkage of nearly 20 percent. The surface of the molten mass solidifies first and subsequent shrinkage in the core, which remains molten for a much longer time than the surface, causes the formation of voids in the center of the molding.

Known processes for the production of solid blocks from high density polyethylene generally require that the molten polyethylene be compressed into a mold which is then allowed to cool over a long period under applied pressure under carefully controlled conditions. The types of block which may be produced in this way are severely limited, the output is slow and the process is costly.

An object of the present invention is to provide an improved process for the production of void-free solid blocks which involves lower costs than hitherto.

A further object is to provide a process whereby higher rates of production can be obtained.

Other and further objects and advantages of the invention will become apparent to those skilled in the art upon consideration of the accompanying disclosure and the drawing which is a schematic representation of apparatus suitable for practicing the process of this invention.

According to the present invention, the process for the production of a solid block of thermoplastic material comprises extruding the material, stretching the hot extrudate, and forming it to the desired shape in a mold.

The process of the present invention is particularly suitable for the formation of solid blocks from polyethylene or a copolymer containing a major proportion of ethylene and having a density greater than 0.94. These high density polymers are available commercially and can be prepared by several processes described in the literature.

The extrusion conditions can be those conventionally employed for the thermoplastic material used. Most suitably the extrudate is so shaped that it can readily be formed to the desired shape in a mold. This can be conveniently achieved by attaching a forming box having the desired cross-sectional shape to the extrusion machine. Thus, the extruding thermoplastic material takes up the desired cross-sectional shape in the forming box and is readily brought to its final shape in the mold. This use of a forming box has the advantage that the material is substantially free from internal stress and strain. This is particularly important when large blocks are being produced.

It is an essential feature of the process of the present invention to stretch the hot extrudate. Preferably, the stretching is carried out on the hot extrudate right after it has been shaped by the extrusion. A particularly convenient method of stretching the extrudate is to extrude the thermoplastic material in a downwardly direction so that the weight of the extruded material causes the extrudate to stretch as it leaves the extrusion machine. It will be appreciated that with this method of stretching the extrudate, the amount of stretch will to some extent depend on the length of extrudate formed before the mold is filled and the extrudate is cut. When it is desired to form long blocks of thermoplastic material according to this technique, it may be necessary to have a moving base in the mold which partially supports the extrudate to prevent over stretching of the extrudate.

The amount of stretch is preferably so controlled that the cross-sectional area of the stretched extrudate is at least 15 percent, e.g., from 15 to 75 percent, less than the cross-sectional area of the extrudate on leaving the extrusion machine. Any forming boxes and the like which shape the extrudate are considered to be part of the machine for the purposes of these preferred limits.

The relative size of the extrusion machine or forming box attached thereto is preferably so chosen in relation to the mold to be filled so that where possible the cross-sectional area of the stretched extrudate is not more than 48 percent less than the maximum corresponding cross-sectional area of the mold to be filled. In this way the possibility of air becoming trapped in the mold when it is filled is reduced.

As stated above, the extrudate is most suitably shaped so that it can readily be formed to the desired shape in a mold after it has been stretched. Thus, if it is desired to form a block having a constant cross-section in one direction, it is preferred that the extrusion and stretching steps of the process shall result in an extrudate having substantially the desired cross-section. In this way the stretched extrudate can be readily fitted into the final mold with substantially no reshaping. However, the process of the present invention is by no means limited to the formation of blocks having constant cross-sections. It can be readily used to form blocks of varying cross-section by the choice of a suitable mold.

The stretched extrudate is preferably under slight pressure in the mold to ensure that it takes up the shape of the mold.

The molds used in the process of the present invention can be made from many different materials such as, for example, asbestos cement, steel and aluminum. A suitable allowance for shrinkage should be made when designing the mold.

A particular advantage of the process of the present invention is that the rate of cooling of the thermoplastic material in the mold is not so critical as in previous processes. However, for the best results with large blocks the mold should be insulated to control the rate of cooling.

A more comprehensive understanding of the invention can be obtained by referring to the following illustrative examples, which are not intended, however, to be unduly limitative of the invention.

EXAMPLE I

Void-free solid blocks 5½" diameter by 26" long weighing 21 pounds were produced from a high density polyethylene in the apparatus shown in the drawing.

A right angle die 10 was bolted to a 2½ inch single screw extruder 11 so that the outlet of the die was facing downwards. A metal forming box 12 was bolted to the outlet flange of the angled die. The forming box was insulated with asbestos and heated over the parallel section by means of a thermal tape.

The molten polyethylene 13 was extruded through the open ended forming box and allowed to stretch down into the open top of the block mold 14 positioned below. Extrusion continued until the block mold was full. The molten material was cut through at the top of the filled block mold which was removed and replaced by an empty block mold without stopping the extruder.

Four inch diameter weights totalling 18 pounds were placed centrally on top of the polyethylene in each of the filled molds. The molds were then covered by an insulated jacket and allowed to cool in air for eight to twelve hours until the polyethylene had completely solidified.

Some of the block molds were cut from 6 inch diameter asbestos cement pipe and some were cut from 6 inch steel pipe. Both types of pipe were insulated with asbestos rope. The surface of the blocks produced in the asbestos cement molds tended to be more even and smooth than those produced in the steel molds.

Blocks produced under these conditions were completely free from voids. The conditions used were as follows.

Extruder temperatures:
    Feed section _____ Cooled
    Barrel _____ °C__ 200/220/250
    Die _____ °C__ 250
    Screw _____ Neutral
Extruder screw speed _____ r.p.m__ 50

The cross-sectional area of the forming box was 19 square inches and of the stretched extrudate 14.7 square inches, there was thus a reduction of 22.6 percent in the cross-sectional area of the extrudate leaving the forming box.

EXAMPLE II

Void-free solid irregular blocks 12½ inches long by approximately 4½ inches high and weighing 3 pounds were produced from high density polyethylene.

The equipment and extruder conditions were the same as for Example I except that a split aluminum mold was used in place of the block molds.

The molten material coming from the forming box was additionally stretched by hand so that its dimensions were reduced to approximately 2½" x 2½" x 13½" long. this amounted to a reduction of about 72.4 percent in cross-sectional area of the extrudate leaving the forming box. This section of the molten material was cut from the mass and placed in a split aluminum mold which was pressed together and clamped.

The filled mold was immediately placed in a bath of cold water. After fifteen minutes the mold was removed from the water bath and the molding removed. The molding was allowed to cool in air for half an hour and then placed in a water bath, for one hour, to solidify.

Using this technique, moldings which are completely free from voids have been produced.

With nine split molds operating in a controlled sequence, thirty of these three pound irregular shaped blocks could be produced per hour from the extruder.

As will be evident to those skilled in the art, many variations and modifications can be practiced upon consideration of the foregoing disclosure. Such variations and modifications are clearly believed to be within the spirit and scope of the invention.

I claim:
1. A process for the production of a solid block consisting assentially of a polymeric thermoplastic material which comprises melt extruding said thermoplastic material through an extrusion zone, stretching the resulting hot extrudate to achieve a cross-sectional area at least 15 to 75 percent less than the cross-sectional area of the extrudate on leaving said extrusion zone, and introducing the resulting stretched extrudate into a mold, and thereafter molding said stretched extrudate in said mold, thereby forming a substantially void free solid block of said polymeric thermoplastic material.

2. A process according to claim 1 wherein the extrudate is introduced prior to stretching into a forming zone wherein the extrudate achieves a cross-sectional area similar to that to be achieved in said mold.

3. A process according to claim 1 in which said thermoplastic material is a polymer of ethylene.

4. A process according to claim 1 in which said thermoplastic material is extruded downwardly from said extrusion zone so that the weight of extruded material causes said extrudate to stretch.

References Cited

UNITED STATES PATENTS

| | | | |
|---|---|---|---|
| 1,703,316 | 2/1929 | Miller | 264—294 |
| 2,648,098 | 8/1953 | McElligott | 264—75 |
| 2,952,877 | 9/1960 | Park | 264—210 |
| 3,042,972 | 7/1962 | Lafferty | 264—210 |
| 3,083,410 | 4/1963 | McGlamery | 264—280 |
| 3,159,698 | 12/1964 | Suh et al. | 264—210 |

DONALD J. ARNOLD, *Primary Examiner.*

A. H. BRODMERKEL, *Examiner.*